United States Patent Office 2,695,309
Patented Nov. 23, 1954

2,695,309

METHOD OF PREPARING 2-ACETAMINO-1-ACETOXY-3-OXO-3-PHENYLPROPANE

Gino Carrara, Milan, Italy, assignor to Lepetit S. A., Milan, Italy

No Drawing. Application June 29, 1950, Serial No. 171,251

Claims priority, application Italy December 22, 1949

3 Claims. (Cl. 260—490)

The present invention relates to the preparation of intermediates suitable for use in the manufacture of racemic and levo-rotatory chloramphenicol.

More particularly, the invention relates to the preparation of 1-acetoxy-2-acetylamino-3-oxo-3-phenyl propane and of 1-acetoxy-2-acetylamino-3-phenyl-1,3-propanediol from 1-aectoxy-3-oxo-3-phenyl propane.

Various method of preparing racemic and levo-rotatory chloramphenicol are described in the literature (JACS, July 1949), in issued patents and in certain of my earlier patent applications.

I have now found that racemic and levo-rotatory chloramphenicol can be prepared in simple and convenient manner by starting with, for example, 1-acetoxy-3-oxo-3-phenyl propane. In accordance with the present invention, this starting compound is nitrosated with sodium nitrite in an acetic solution or with an alkyl nitrite in an ethereal solution in the presence of HCl. The isonitroso derivative is subjected, even without isolating it, to a selective reduction and acylated, or it is subjected to a reducing acylation in order to obtain 1-acetoxy-2-acetamino-3-oxo-3-phenyl-propane.

For the production of chloramphenicol, the 1-acetoxy-2-acetamino-3-oxo-phenyl propane is reduced in the presence of catalysts and a mixture of 1-acetyl-2-acetamino-3-phenyl-1,3-propandiol of threo and erythro form is obtained. Without separating the two products, this mixture is dissolved in concentrated sulphuric acid and the corresponding acetoxy-oxazolidine in a sulphuric acid solution is obtained in accordance with my patent application Ser. No. 132,985, filed Dec. 14, 1949. Without it being necessary to isolate it, the latter is subjected to nitration with concentrated nitric acid and from the nitrating mixture a solution of the hydrochloride of 1-p-nitrophenyl-2-amino-1,3-propandiol of threo form is finally obtained. From this hydrochloride the base may be isolated and separated into the optical antipodes according to my co-pending application Ser. No. 132,986, filed Dec. 14, 1949, now abandoned. The solution of the hydrochloride of the above mentioned racemate, or the solution of the hydrochloride of the levo-rotatory base separated as above may be converted to racemic chloramphenicol or levo-rotatory chloramphenicol by substitution of hydrogen in the amino group by the dichloracetic residue by a reaction according to Schotten Baumann.

The reactions involved in the process claimed herein may be graphically represented as follows:

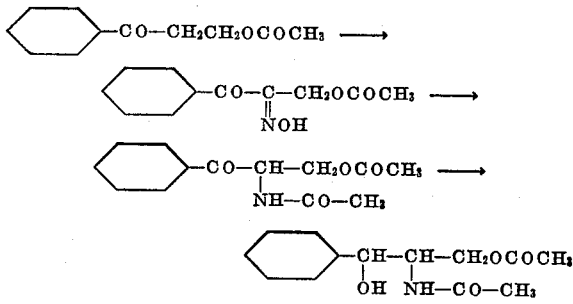

Example 1113 grams 1-acetoxy-3-oxo-3-phenyl-propane (ZBl. 1933 II. 1186) in 840 cubic centimeters acetic acid are treated at 30/35° with 450 grams finely pulverized sodium nitrite. On completion of the reaction 1.450 kgs. ice and 1.160 kgs. acetic anhydride are added. While efficiently stirring further 1.450 kgs. ice, 0.580 kg. acetic anhydride and 1 kg. zinc are added, keeping the temperature below 20°.

On completion of the reaction the mixture is filtered. The uppers on the filtre are repeatedly dissolved with acetone and the acetonic extracts are concentrated to a paste. The filtrate is likewise concentrated in vacuum to a paste. The two residues are brought together, the mixture is repeatedly diluted with water and the water insoluble portion is recrystallized from alcohol. The 1-acetoxy-2-acetamino-3-oxo-3-phenyl-propane is obtained, of which the melting point is 84°–85° C.

The above mentioned product is dissolved in 10 parts methylic alcohol, 2 parts palladium-carbon catalyst with 5% palladium are added and reduction at ordinary pressure and temperature is carried out till absorption of 10% excess over the theoretical value of hydrogen. The product is filtered from the catalyst and methylic alcohol is distilled in vacuum. The residue obtained, which is a mixture of 1-acetoxy-2-acetamino - 3 - phenyl-1,3-propandiol of threo and erythro form, is dissolved in accordance with my application 132,985 in 3 times its weight concentrated sulphuric acid, and the solution is allowed to rest at room temperature during 12 hours.

This solution is poured at a temperature of about −15° C. into three parts concentrated nitric acid of a density of 1.42. It is allowed to rest during about one hour at this temperature and during about half-an-hour at +15° C. It is then poured on ice. It is thoroughly extracted by ethyl acetate after having neutralised it by means of sodium carbonate. It is dried and the acetic extract is distilled. The residue is dissolved in 10 parts 5% hydrochloric acid and heated in a water bath during two hours. It is then concentrated in vacuum to a small volume and admixed with an equal part of concentrated hydrochloric acid, and the hydrochloride of 1-nitrophenyl-2-amino-1,3-propandiol is allowed to crystallize. Its melting point is 177–180° C.

From this hydrochloride the base may be insulated and separated into the two antipodes in accordance with my patent application Ser. No. 132,986.

The hydrochloride of the racemic nitrobase or the hydrochloride of the levo-rotatory nitrobase are suspended in water and treated while actively stirring with a slight excess of sodium bicarbonate and with the stoichiometric quantity of the chloride of the dichloracetic acid.

From the reaction the racemic chloroamphenicol or the levo-rotatory chloramphenicol mixed with an organic salts are separated.

The separated products are filtered and recrystallized from water and are therefore obtained in a condition of sufficient chemical purity.

Levo-rotatory chloroamphenicol, white crystals, melting point 150°/151° C.
  $[\alpha]_n^{15}$ −22.5 (2% in ethyl acetate)
Racemic chloramphenicol, white crystals, melting point 152°/153° C.

What I claim is:
1. Process for the preparation of an intermediate suitable for the manufacture of antibiotically active chloramphenicol, which comprises reacting 1-acetoxy-3-oxo-3-phenylpropane with a member of the group consisting of sodium and alkyl nitrites under acid conditions at a temperature not higher than about 35° C., adding to the resulting acidic reaction mixture an acetylating agent and a metal which generates hydrogen in acid solution, and keeping the temperature below 20° to effect reduction and acetylation of the formed 2-isonitroso group to produce 1-acetoxy-2-acetamino-3-oxo-3-phenylpropane.

2. Process for the preparation of an intermediate suitable for the manufacture of antibiotically active chloramphenicol, which comprises reacting 1-acetoxy-3-oxo-3-phenylpropane with sodium nitrite in acetic acid solution at a temperature of about 30–35° C., adding to the resulting acidic reaction mixture an acetylating agent and a metal which generates hydrogen in acetic acid solution, and keeping the temperature below 20° C. to effect reduction and acetylation of the formed 2-isonitroso group to produce 1-acetoxy-2-acetamino-3-oxo-3-phenylpropane.

3. Process for the preparation of an intermediate suitable for the manufacture of antibiotically active chloramphenicol, which comprises reacting 1-acetoxy-3-oxo-3-phenylpropane with sodium nitrite in acetic acid solution at a temperature of about 30/35° C., adding to the resulting acidic reaction mixture acetic anhydride and zinc, and keeping the temperature below 20° C. to effect reduction and acetylation of the formed 2-nitroso group to produce 1-acetoxy-2-acetamino-3-oxo-3-phenylpropane.

References Cited in the file of this patent

UNITED STATES PATENTS

| Number | Name | Date |
|---|---|---|
| 1,877,795 | Bockmuhl et al. | Sept. 20, 1932 |
| 1,948,162 | Bockmuhl et al. | Feb. 20, 1934 |
| 1,995,709 | Hartung | May 26, 1935 |
| 1,995,710 | Hartung | May 26, 1935 |
| 2,306,765 | Stiller | Dec. 29, 1942 |
| 2,359,707 | Baltzly et al. | Oct. 3, 1944 |
| 2,483,884 | Crooks et al. | Oct. 4, 1949 |
| 2,483,885 | Crooks et al. | Oct. 4, 1949 |
| 2,514,377 | Crooks et al. | July 11, 1950 |
| 2,521,809 | Tishler et al. | Sept. 12, 1950 |
| 2,521,810 | Tishler et al. | Sept. 12, 1950 |

FOREIGN PATENTS

| Number | Country | Date |
|---|---|---|
| 63,224 | Norway | Feb. 17, 1941 |
| 842,117 | France | Feb. 27, 1939 |

OTHER REFERENCES

Countroulis et al., "J. Am. Chem. Soc.," vol. 71, July 1949, pp. 2463 to 2468.

Long et al., "J. Am. Chem. Soc.," vol., 71, July 1949, pp. 2468–72.

Darmon, "Comptes Rendus Acad. Sci.," vol. 197 (1933), page 1329.

Albertson et al., J. Am. Chem. Soc., vol. 70 (1948), pp. 1150–53.

Redemann et al., "J. Biol. Chem.," vol. 130 (1939), pp. 341 to 348.

Carrara et al., "Gazz. Chim. Ital.," vol. 80 (Dec. 1950), pp. 822–30.